US 9,563,250 B2

(12) United States Patent
Rychlik et al.

(10) Patent No.: US 9,563,250 B2
(45) Date of Patent: Feb. 7, 2017

(54) SYSTEM AND METHOD FOR CONTROLLING CENTRAL PROCESSING UNIT POWER BASED ON INFERRED WORKLOAD PARALLELISM

(75) Inventors: Bohuslav Rychlik, San Diego, CA (US); Robert A. Glenn, Boulder, CO (US); Ali Iranli, San Diego, CA (US); Brian J. Salsbery, Boulder, CO (US); Sumit Sur, Boulder, CO (US); Steven S. Thomson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 12/944,140

(22) Filed: Nov. 11, 2010

(65) Prior Publication Data

US 2011/0145615 A1 Jun. 16, 2011

Related U.S. Application Data

(60) Provisional application No. 61/286,953, filed on Dec. 16, 2009.

(51) Int. Cl.
*G06F 1/32* (2006.01)

(52) U.S. Cl.
CPC .............. *G06F 1/3203* (2013.01); *G06F 1/324* (2013.01); *G06F 1/3287* (2013.01);
(Continued)

(58) Field of Classification Search
CPC ...... G06F 1/3203; G06F 1/324; G06F 1/3287; G06F 1/3296
See application file for complete search history.

(56) References Cited

U.S. PATENT DOCUMENTS

| 4,601,008 A | 7/1986 | Kato |
| 5,644,769 A | 7/1997 | Hasiguti |

(Continued)

FOREIGN PATENT DOCUMENTS

| CN | 1678971 A | 10/2005 |
| CN | 1692326 A | 11/2005 |

(Continued)

OTHER PUBLICATIONS

Semeraro et al., "Energy-Efficient Processor Design Using Multiple Clock Domains with Dynamic Voltage and Frequency Scaling," International Symposium on High-Performance Computer Architecture, pp. 0029, Eighth International Symposium on High-Performance Computer architecture (HPCA'02), 2002, Boston, Massachusetts. ISBN: 0-7695-1525-8.

(Continued)

*Primary Examiner* — Paul Yanchus, III
*Assistant Examiner* — Vincent Chang
(74) *Attorney, Agent, or Firm* — Nicholas A. Cole

(57) ABSTRACT

A method of dynamically controlling power within a multicore CPU is disclosed and may include receiving a degree of parallelism in a workload of a zeroth core and determining whether the degree of parallelism in the workload of the zeroth core is equal to a first wake condition. Further, the method may include determining a time duration for which the first wake condition is met when the degree of parallelism in the workload of the zeroth core is equal to the first wake condition and determining whether the time duration is equal to a first confirm wake condition. The method may also include invoking an operating system to power up a first core when the time duration is equal to the first confirm wake condition.

40 Claims, 14 Drawing Sheets

(52) U.S. Cl.
CPC ........ *G06F 1/3296* (2013.01); *Y02B 60/1217* (2013.01); *Y02B 60/1282* (2013.01); *Y02B 60/1285* (2013.01)

(56) References Cited

U.S. PATENT DOCUMENTS

| | | | |
|---|---|---|---|
| 6,073,244 A | 6/2000 | Iwazaki | |
| 6,076,171 A | 6/2000 | Kawata | |
| 6,804,632 B2 | 10/2004 | Orenstien et al. | |
| 6,829,713 B2 | 12/2004 | Cooper et al. | |
| 6,978,389 B2 | 12/2005 | Jahnke | |
| 7,043,405 B2 | 5/2006 | Orenstien et al. | |
| 7,058,824 B2 | 6/2006 | Plante et al. | |
| 7,107,187 B1 | 9/2006 | Saghier et al. | |
| 7,133,806 B2 | 11/2006 | Prasad | |
| 7,134,031 B2 | 11/2006 | Flautner | |
| 7,219,245 B1 | 5/2007 | Raghuvanshi | |
| 7,233,188 B1 | 6/2007 | Takano et al. | |
| 7,263,457 B2 | 8/2007 | White et al. | |
| 7,346,787 B2 | 3/2008 | Vaidya et al. | |
| 7,369,967 B1 | 5/2008 | Washburn et al. | |
| 7,370,189 B2 | 5/2008 | Fischer et al. | |
| 7,398,407 B2 | 7/2008 | Jorgenson et al. | |
| 7,401,240 B2 | 7/2008 | Heller, Jr. et al. | |
| 7,437,581 B2 | 10/2008 | Grochowski et al. | |
| 7,467,291 B1 | 12/2008 | Cockroft et al. | |
| 7,500,124 B2 | 3/2009 | Seo | |
| 7,543,161 B2 | 6/2009 | Olszewski et al. | |
| 7,624,295 B2 | 11/2009 | Taketoshi et al. | |
| 7,650,527 B2 | 1/2010 | Rambo et al. | |
| 7,689,838 B2 | 3/2010 | Srinivasan et al. | |
| 7,711,966 B2 | 5/2010 | Prabhakaran et al. | |
| 7,761,874 B2 | 7/2010 | Bodas | |
| 7,849,349 B2 | 12/2010 | Tamlyn | |
| 7,949,887 B2 | 5/2011 | Gunther et al. | |
| 2002/0029353 A1 | 3/2002 | Hwang | |
| 2002/0046354 A1 | 4/2002 | Ostrom et al. | |
| 2002/0188877 A1 | 12/2002 | Buch | |
| 2003/0115495 A1 | 6/2003 | Rawson, III | |
| 2003/0177163 A1 | 9/2003 | Nomura | |
| 2004/0225902 A1 | 11/2004 | Cesare et al. | |
| 2004/0254765 A1 | 12/2004 | Lee et al. | |
| 2006/0036878 A1 | 2/2006 | Rothman et al. | |
| 2006/0095807 A1* | 5/2006 | Grochowski et al. | 713/324 |
| 2006/0123253 A1 | 6/2006 | Morgan et al. | |
| 2006/0149975 A1 | 7/2006 | Rotem et al. | |
| 2007/0016815 A1 | 1/2007 | Cooper et al. | |
| 2007/0033425 A1 | 2/2007 | Clark | |
| 2007/0033526 A1 | 2/2007 | Thompson et al. | |
| 2007/0061108 A1 | 3/2007 | DeWitt et al. | |
| 2007/0255929 A1 | 11/2007 | Kasahara et al. | |
| 2008/0005591 A1 | 1/2008 | Trautman et al. | |
| 2008/0028244 A1 | 1/2008 | Capps et al. | |
| 2008/0162965 A1 | 7/2008 | Marinas et al. | |
| 2008/0168287 A1 | 7/2008 | Berry et al. | |
| 2008/0201591 A1 | 8/2008 | Hu et al. | |
| 2008/0310099 A1 | 12/2008 | Monferrer et al. | |
| 2009/0037922 A1 | 2/2009 | Herington | |
| 2009/0049314 A1 | 2/2009 | Taha et al. | |
| 2009/0106576 A1 | 4/2009 | Jacobowitz et al. | |
| 2009/0150695 A1 | 6/2009 | Song | |
| 2009/0150696 A1 | 6/2009 | Song et al. | |
| 2009/0187775 A1 | 7/2009 | Ishikawa | |
| 2009/0217276 A1 | 8/2009 | Brenner et al. | |
| 2009/0230930 A1 | 9/2009 | Jain et al. | |
| 2009/0249347 A1 | 10/2009 | Henmi | |
| 2009/0271646 A1 | 10/2009 | Talwar et al. | |
| 2009/0276642 A1 | 11/2009 | Burton et al. | |
| 2010/0037038 A1* | 2/2010 | Bieswanger et al. | 712/220 |
| 2010/0076733 A1 | 3/2010 | Kumar et al. | |
| 2010/0122101 A1 | 5/2010 | Naffziger et al. | |
| 2010/0146316 A1* | 6/2010 | Carter | G06F 1/3203 713/322 |
| 2010/0169609 A1* | 7/2010 | Finkelstein et al. | 712/43 |
| 2010/0299541 A1* | 11/2010 | Ishikawa et al. | 713/300 |
| 2011/0023047 A1 | 1/2011 | Memik et al. | |
| 2011/0145559 A1 | 6/2011 | Thomson et al. | |
| 2011/0145605 A1 | 6/2011 | Sur et al. | |
| 2011/0145616 A1 | 6/2011 | Rychlik et al. | |
| 2011/0145617 A1 | 6/2011 | Thomson et al. | |
| 2011/0145624 A1 | 6/2011 | Rychlik et al. | |
| 2011/0145824 A1 | 6/2011 | Thomson et al. | |
| 2013/0074085 A1 | 3/2013 | Thomson et al. | |
| 2013/0151879 A1 | 6/2013 | Thomson et al. | |
| 2014/0181542 A1 | 6/2014 | Sur et al. | |

FOREIGN PATENT DOCUMENTS

| | | |
|---|---|---|
| CN | 101076770 A | 11/2007 |
| CN | 101111814 A | 1/2008 |
| CN | 101135928 A | 3/2008 |
| CN | 101211215 A | 7/2008 |
| CN | 101241390 A | 8/2008 |
| CN | 101351759 A | 1/2009 |
| CN | 101401056 A | 4/2009 |
| CN | 101403944 A | 4/2009 |
| CN | 101414268 A | 4/2009 |
| CN | 101436098 A | 5/2009 |
| EP | 0098169 A2 | 1/1984 |
| EP | 0942363 A2 | 9/1999 |
| EP | 1496424 A2 | 1/2005 |
| GB | 2445167 A | 7/2008 |
| JP | H0351902 A | 3/1991 |
| JP | 8006681 A | 1/1996 |
| JP | H08190535 A | 7/1996 |
| JP | H10268963 A | 10/1998 |
| JP | H11143839 A | 5/1999 |
| JP | H11282695 A | 10/1999 |
| JP | 2002099433 A | 4/2002 |
| JP | 2003256067 A | 9/2003 |
| JP | 2004533674 A | 11/2004 |
| JP | 2005128937 A | 5/2005 |
| JP | 2005173928 A | 6/2005 |
| JP | 2006011548 A | 1/2006 |
| JP | 2006268166 A | 10/2006 |
| JP | 2008059054 A | 3/2008 |
| JP | 2008117397 A | 5/2008 |
| JP | 2008513912 A | 5/2008 |
| JP | 2008129846 A | 6/2008 |
| JP | 2008165798 A | 7/2008 |
| JP | 2008269249 A | 11/2008 |
| JP | 2009503728 A | 1/2009 |
| JP | 2009037335 A | 2/2009 |
| JP | 2009140157 A | 6/2009 |
| JP | 2009169858 A | 7/2009 |
| JP | 2009238024 A | 10/2009 |
| JP | 2010518525 A | 5/2010 |
| KR | 20070049226 A | 5/2007 |
| KR | 20090107490 A | 10/2009 |
| TW | 200907660 A | 2/2009 |
| WO | WO0225414 A2 | 3/2002 |
| WO | WO-02074046 A2 | 9/2002 |
| WO | WO-2004044720 A2 | 5/2004 |
| WO | WO2005119412 A1 | 12/2005 |
| WO | 2006037119 A2 | 4/2006 |
| WO | 2007007300 A2 | 1/2007 |
| WO | WO-2007019003 A2 | 2/2007 |
| WO | 2008047179 A1 | 4/2008 |

OTHER PUBLICATIONS

Compaq et al, "Advanced Configuration and Power Interface Specification", Compaq Computer Corporation, Intel Cor0poration, Microsoft Corporation, Phoenix Technologies Ltd., Toshiba Corporation, Revision 2.0, Jul. 27, 2000.

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.

International Search Report and Written Opinion—PCT/US2010/059560—ISA/EPO—Jun. 15, 2011.

(56) References Cited

OTHER PUBLICATIONS

International Search Report and Written Opinion—PCT/US2010/059562, ISA/EPO—May 27, 2011.
International Search Report and Written Opinion—PCT/US2010/058075—ISA/EPO—Apr. 27, 2011.
International Search Report and Written Opinion—PCT/US2010/059535, ISA/EPO—Apr. 28, 2011.
International Search Report and Written Opinion—PCT/US2010/059538, International Search Authority—European Patent Office—Apr. 7, 2011.
Kanai J, et al., "Statistical Prediction-based Energy-Aware Linux Scheduler for CMP systems", Proceedings of computer system symposium (IPSJ symposium series), vol. 2008, No. 12, Information Processing Society of Japan, Nov. 5, 2008, pp. 77-86.
iDebian, CPU frequency scaling in Linux, Jun. 26, 2008, iDebian's Weblog.
Stallings, W., "Operating systems internals and design principles," 2005, Pearson, 5th edition, section 3.2, pp. 111-126.
Kondo M., et al., "Dynamic Processor Throttling for Low Power Computing", IPSJ Transactions on Advanced Computing Systems, Information Processing Society of Japan, May 15, 2004, vol. 45 No. SIG6 (ACS6), pp. 1-11.
Sasaki H., et al., "Dynamic Optimization for CMP by Efficient Regression Modeling", IPSJ SIG Technical Reports, Japan, Information Processing Society of Japan, Jul. 29, 2008, vol. 2008, No. 75, pp. 31-36.
Shindo T., et al., "Multicore is better than Single Core-Section 3 <hardware />High-Speed Bus and Storage Hierarchy Key to Utilizing On-Chip Benefits," Nikkei Electronics, Nikkei Business Publications, Inc., Aug. 30, 2004, No. 881, pp. 116 to 121.

\* cited by examiner

SYSTEM AND METHOD FOR CONTROLLING CENTRAL PROCESSING UNIT POWER BASED ON INFERRED WORKLOAD PARALLELISM

RELATED APPLICATIONS

The present application claims priority to U.S. Provisional Patent Application Ser. No. 61/286,953, entitled SYSTEM AND METHOD OF DYNAMICALLY CONTROLLING A PLURALITY OF CORES IN A MULTICORE CENTRAL PROCESSING UNIT, filed on Dec. 16, 2009, the contents of which are fully incorporated by reference.

CROSS-REFERENCED APPLICATIONS

The present application is related to, and incorporates by reference, U.S. patent application Ser. No. 12/944,202, entitled SYSTEM AND METHOD FOR CONTROLLING CENTRAL PROCESSING UNIT POWER IN A VIRTUALIZED SYSTEM, by Rychlik et al., filed concurrently. The present application is related to, and incorporates by reference, U.S. patent application Ser. No. 12/944,321, entitled SYSTEM AND METHOD FOR ASYNCHRONOUSLY AND INDEPENDENTLY CONTROLLING CORE CLOCKS IN A MULTICORE CENTRAL PROCESSING UNIT, by Rychlik et al., filed concurrently. The present application is related to, and incorporates by reference, U.S. patent application Ser. No. 12/944,378, entitled SYSTEM AND METHOD FOR CONTROLLING CENTRAL PROCESSING UNIT POWER WITH REDUCED FREQUENCY OSCILLATIONS, by Thomson et al., filed concurrently. The present application is related to, and incorporates by reference, U.S. patent application Ser. No. 12/944,467, entitled SYSTEM AND METHOD FOR CONTROLLING CENTRAL PROCESSING UNIT POWER WITH GUARANTEED TRANSIENT DEADLINES, by Thomson et al., filed concurrently. The present application is related to, and incorporates by reference, U.S. patent application Ser. No. 12/944,561, entitled SYSTEM AND METHOD FOR CONTROLLING CENTRAL PROCESSING UNIT POWER WITH GUARANTEED STEADY STATE DEADLINES, by Thomson et al., filed concurrently. The present application is related to, and incorporates by reference, U.S. patent application Ser. No. 12/944,564, entitled SYSTEM AND METHOD FOR DYNAMICALLY CONTROLLING A PLURALITY OF CORES IN A MULTICORE CENTRAL PROCESSING UNIT BASED ON TEMPERATURE, by Sur et al., filed concurrently.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the processing power required to support such functionality also increases. Further, as the computing power increases, there exists a greater need to effectively manage the processor, or processors, that provide the computing power.

Accordingly, what is needed is an improved method of controlling power within a multicore CPU.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
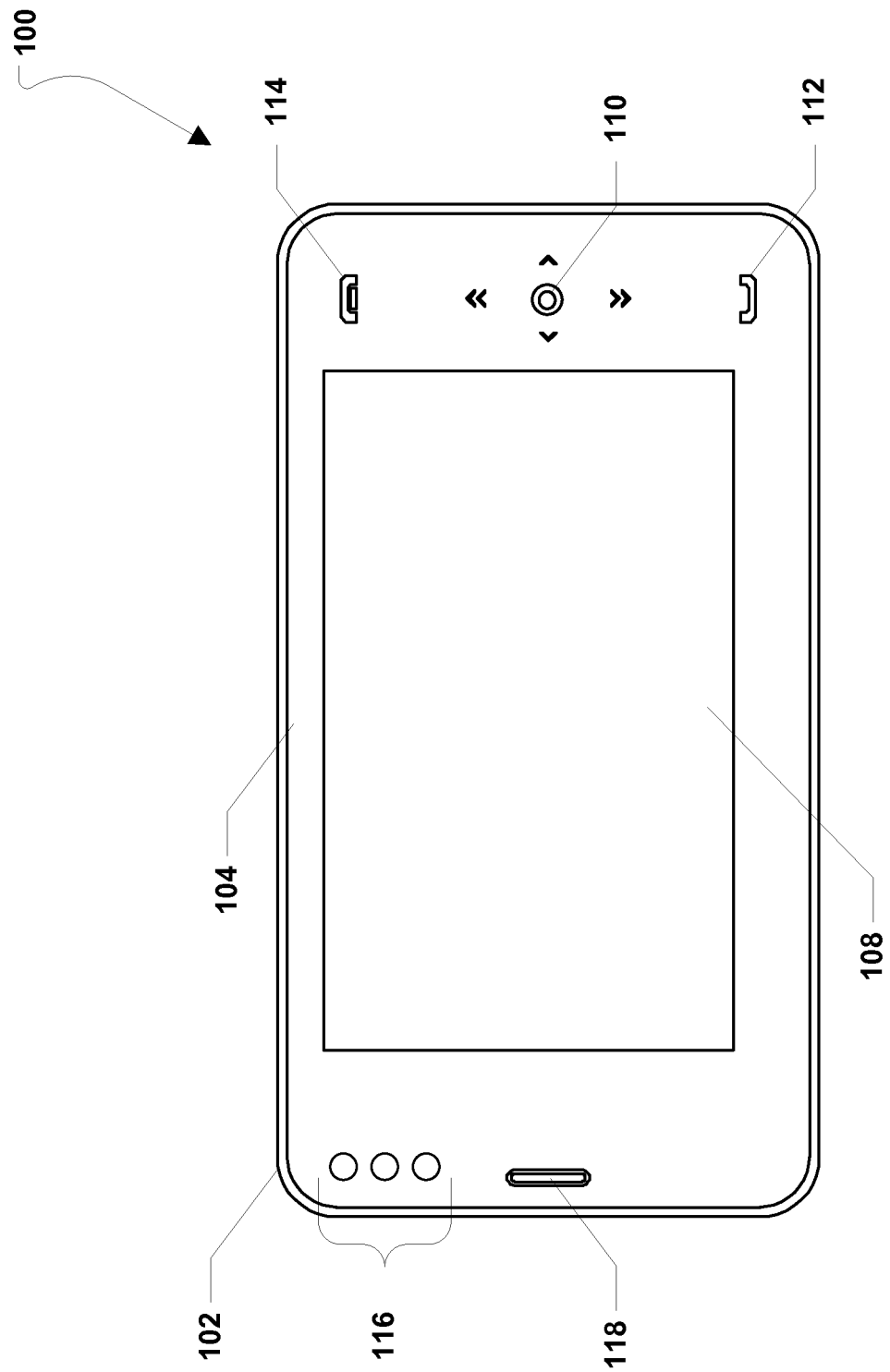
FIG. 1 is a front plan view of a first aspect of a portable computing device (PCD) in a closed position.
Figure 2:
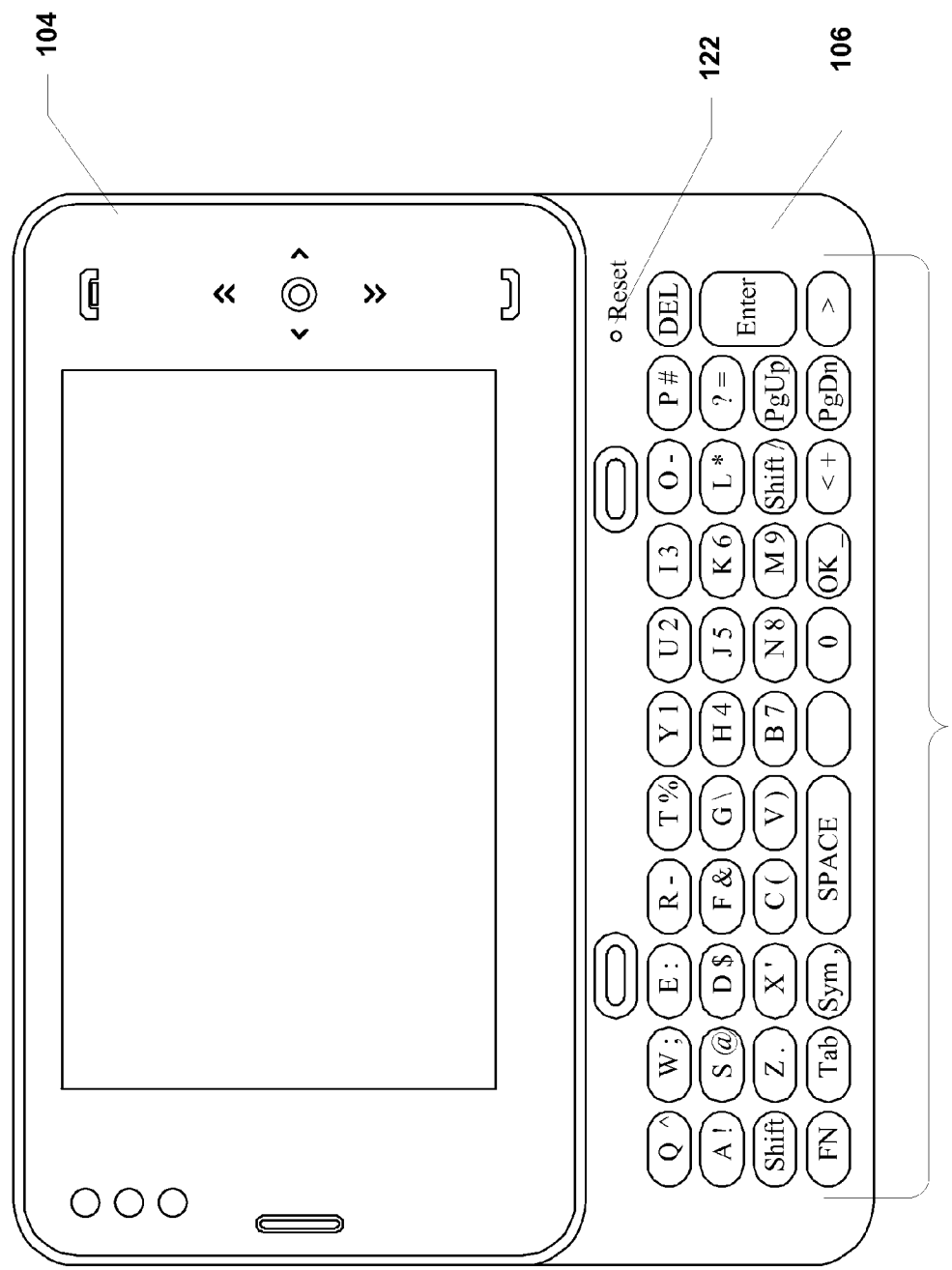
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
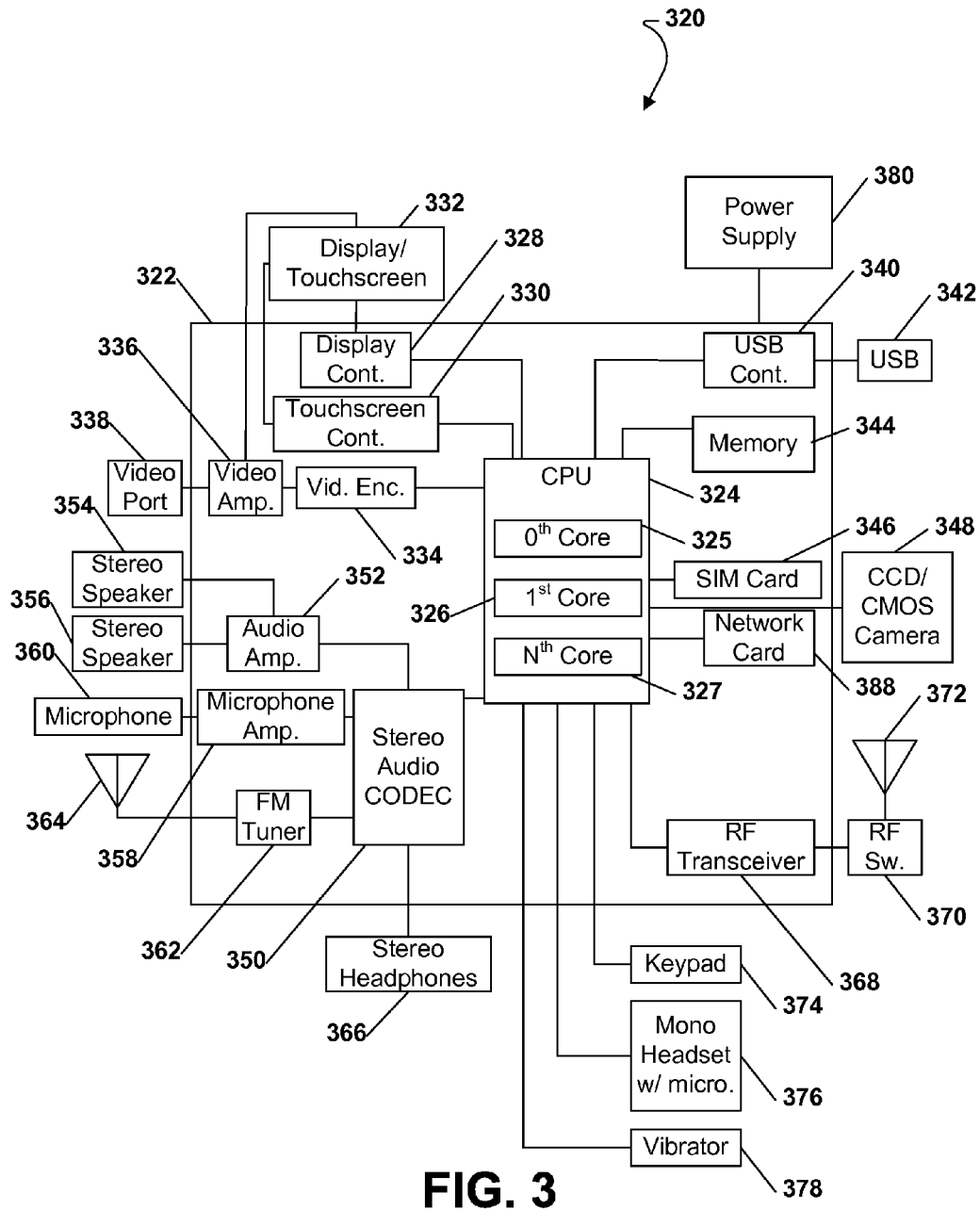
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a display/touchscreen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, or a combination thereof may serve as a means for executing one or more of the method steps described herein in order to control power to each CPU, or core, within the multicore CPU 324.

Figure 4:
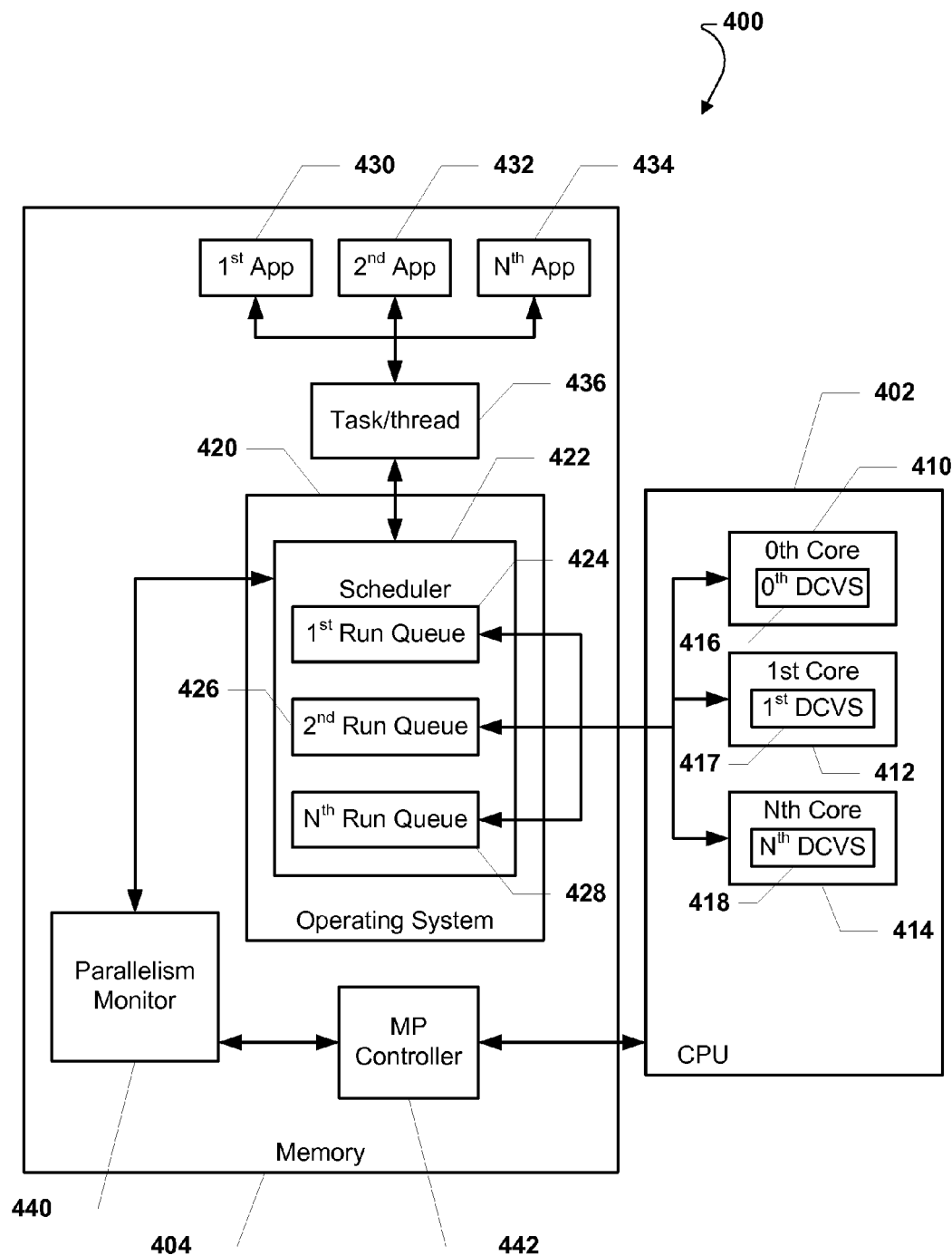
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a parallelism monitor 440 and a multicore processor (MP) controller 442 stored thereon. The parallelism monitor 440 may be connected to the operating system 420 and the MP controller 442. Specifically, the parallelism monitor 440 may be connected to the scheduler 422 within the operating system 420. As described herein, the parallelism monitor 440 may monitor the workload on the cores 410, 412, 414 and the MP controller 442 may control the power to the cores 410, 412, 414 as described below. In a particular aspect, by executing one or more of the method steps, e.g., as computer program instructions, described herein, the parallelism monitor 440, the MP controller 442, or a combination thereof may serve a means for dynamically controlling the power to the cores 410, 412, 414 within the multicore CPU 402.

In a particular dual-core aspect, during operating, the MP controller 442 may receive an input from the parallelism monitor 440. The input may be a total system load. Moreover, the input may be a running average of the degree of parallelism in the workload. Based on the input, the MP controller 442 may determine whether a single core or two cores should be powered on. Further, the MP controller 442 may output a control signal to the multicore CPU 402. The control signal may indicate whether to turn additional cores on or off. In the dual-core example, the MP controller 442 may include four threshold values for controlling the decision to power the cores on and off. The four threshold values may include a number of ready-to-run threads in the OS scheduler queue to trigger a core wake, $N_w$; a time duration for which $N_w$ has been exceed to confirm a core wake, Tw; a number of ready-to-run threads in the OS scheduler to trigger a core sleep, $N_s$; and a time duration for which Ns has been exceeded to confirm a core sleep, $T_s$.

Beginning with a single core active, e.g., the zeroth core 410, when the running average of the degree of parallelism in the workload on the zeroth core 410 meets or exceeds $N_w$ for a duration of at least $T_w$, the MP controller 442 may wake up a second core, e.g., the first core 412. Conversely, when both cores, e.g., the zeroth core 410 and the first core 412, are active and when the degree of parallelism in the workload falls below $N_s$ for at least a duration of $T_s$, the MP controller 442 may decide to put the second core, e.g., the first core 412, to sleep.

In a particular aspect, sustained threshold parallelism over the time $T_w$ implies that the single core is saturated. Further, the cores may be started at the most power efficient voltage-frequency (VF) operating point. In particular aspect, two cores operating at an optimal VF offer more Dhrystone million instructions per second (DMIPS) than a single core operating at a maximum VF. In a dual-core aspect, dual, independent DCVS algorithms may adapt to asymmetric workloads and in some cases, heterogeneous cores. Further, in a dual-core aspect, the two cores should remain active during multi-tasking workloads in order to avoid a performance penalty that is doubled. Also, when the parallelism falls below $N_s$ for the prescribed time $T_s$, the second core should be powered off and not placed in standby. In a particular aspect, placing the second core in standby may increase power leakage and also may reduce performance.

The optimal values of the parameters $N_w$, $T_w$, $N_s$, and $T_s$ may depend on the exact power consumption characteristics of the system 400. However, in one aspect, the values may be as follows:

$N_w$=1.2,
$T_w$=40 milliseconds (ms),
$N_s$=0.8, and
$T_s$=80 ms.

In this particular aspect, $N_w$=1.2 may ensure a sustained parallelism before the second core is awakened. $N_s$=0.8 may ensure a sustained absence of parallelism before the second core is put asleep. $T_s$=80 ms is based on a power collapse threshold of the system, 400 ms. $T_w$=40 ms is half of $T_s$ to improve multicore responsiveness.

Figure 5:
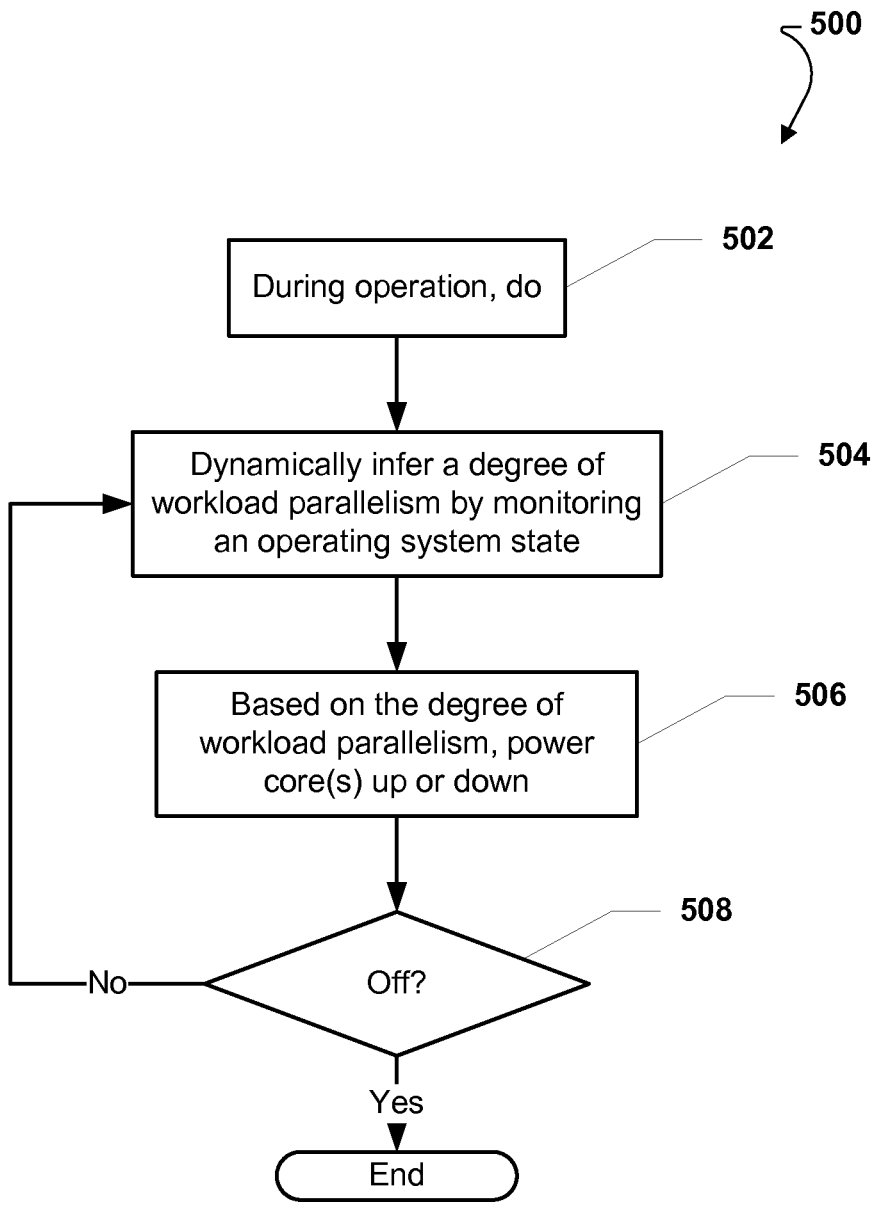
FIG. 5 is a flowchart illustrating a first aspect of a method of dynamically controlling power within a multicore CPU.

FIG. 5 illustrates a first aspect of a method of controlling power within a multi-core processor. The method is generally designated 500. The method 500 commences at block 502 with a do loop in which during operation of a device having a multi-core processor, the succeeding steps may be performed. At block 504, a power controller may dynamically infer a degree of workload parallelism within the CPUs, or cores, e.g., by monitoring an operating system state. Moving to block 506, at least partially based on the degree of workload parallelism, the power controller may power core(s) up or down. In other words, the power controller may turn the cores on or off based on the workload.

At decision 508, the power controller may determine whether the device is powered off. If the device is powered off, the method may end. Otherwise, if the device remains powered on, the method 500 may return to block 504 and the method 500 may continue as described.

Figure 6:
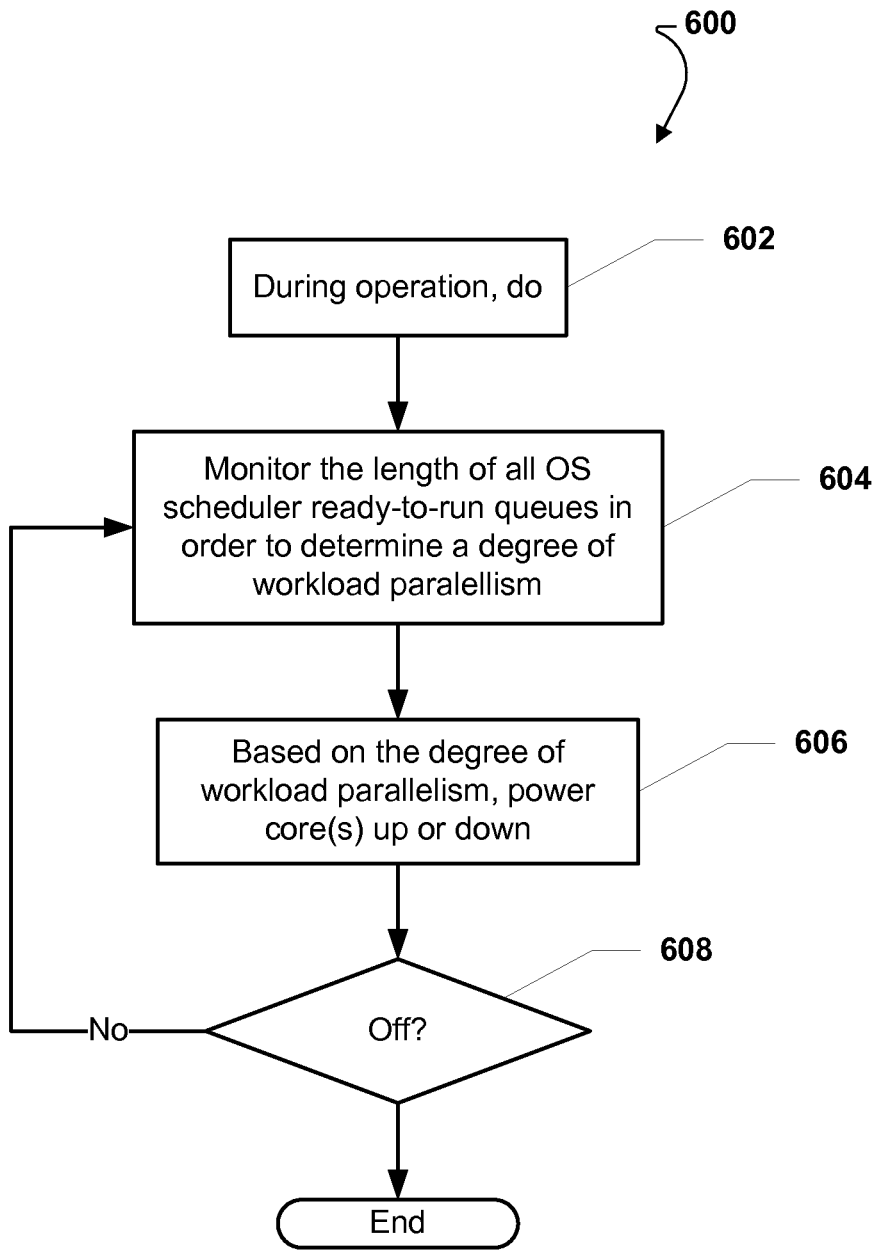
FIG. 6 is a flowchart illustrating a second aspect of a method of dynamically controlling power within a multicore CPU.

Referring now to FIG. 6, a second aspect of a method of controlling power within a multi-core processor is shown and is generally designated 600. The method 600 commences at block 602 with a do loop in which during operation of a device having a multi-core processor, the succeeding steps may be performed. At block 604, a controller, e.g., a parallelism monitor, may monitor the length of all operating system (OS) scheduler ready-to-run queues in order to determine a degree of workload parallelism within the CPUs, or cores. In a particular aspect, the parallelism monitor may be a software program residing in a memory of the device. Further, in a particular aspect, the scheduler ready-to-run queue is a list of current tasks of threads that are available for scheduling on one or more CPUs. Some multicore systems may only have a single ready-to-run queue. Other multicore systems may have multiple ready-to-run queues. Regardless of the number of ready-to-run queues at any instant in time, the total number of tasks, threads, or a combination thereof waiting on these queues, plus a number of tasks, threads, or a combination thereof actually running, may be an approximation for the degree of parallelism in the workload.

Moving to block 606, at least partially based on the degree of workload parallelism, the parallelism monitor may power core(s) up or down. In other words, the parallelism monitor may turn the cores on or off based on the workload.

At decision 608, the parallelism monitor may determine whether the device is powered off. If the device is powered off, the method may end. Otherwise, if the device remains powered on, the method 600 may return to block 604 and the method 600 may continue as described.

Figure 7:
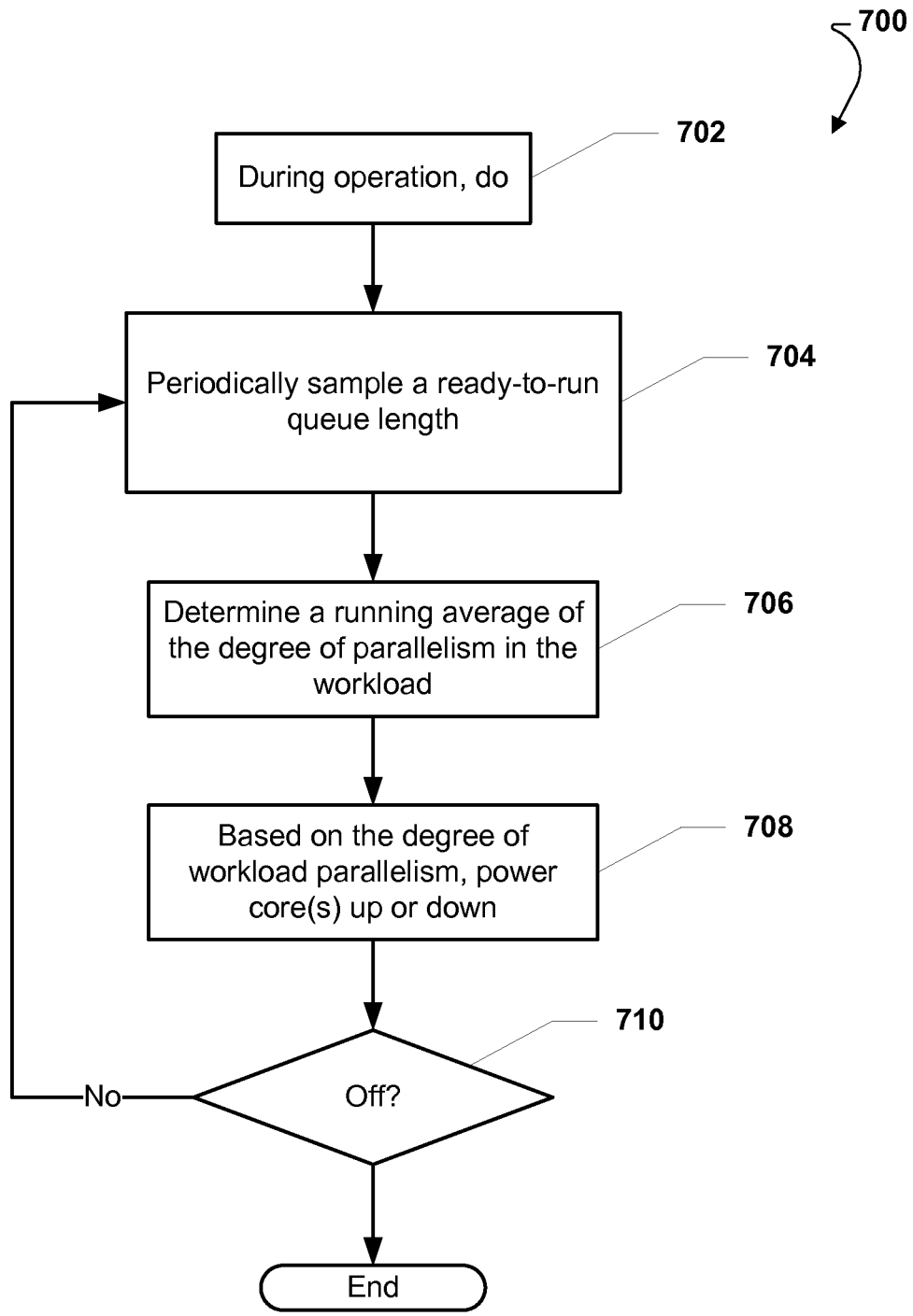
FIG. 7 is a flowchart illustrating a third aspect of a method of dynamically controlling power within a multicore CPU.

Referring to FIG. 7, a third aspect of a method of controlling power within a multi-core processor is shown and is generally designated 700. The method 700 commences at block 702 with a do loop in which during operation of a device having a multi-core processor, the succeeding steps may be performed. At block 704, a parallelism monitor may periodically sample a ready-to-run queue length. For example, the parallelism monitor may sample the ready-to-run queue length every millisecond (1 ms). At block 706, the parallelism monitor may determine a running average of the degree of parallelism in the workload. Moving to block 708, at least partially based on the degree of workload parallelism, the parallelism monitor may power core(s) up or down. In other words, the parallelism monitor may turn the cores on or off based on the workload.

At decision 710, the parallelism monitor may determine whether the device is powered off. If the device is powered off, the method may end. Otherwise, if the device remains powered on, the method 700 may return to block 704 and the method 700 may continue as described.

Figure 8:
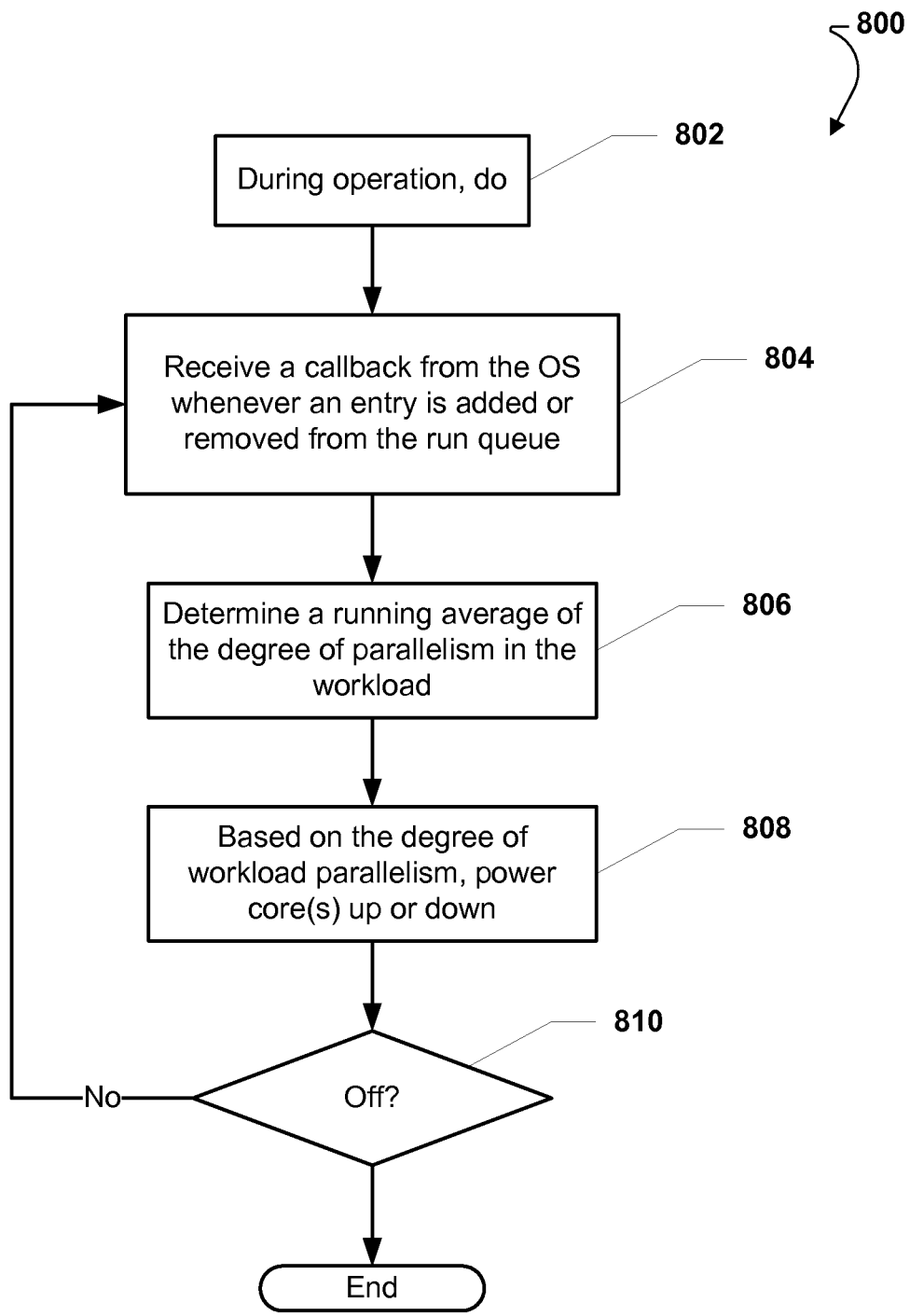
FIG. 8 is a flowchart illustrating a fourth aspect of a method of dynamically controlling power within a multicore CPU.
Figure 9:
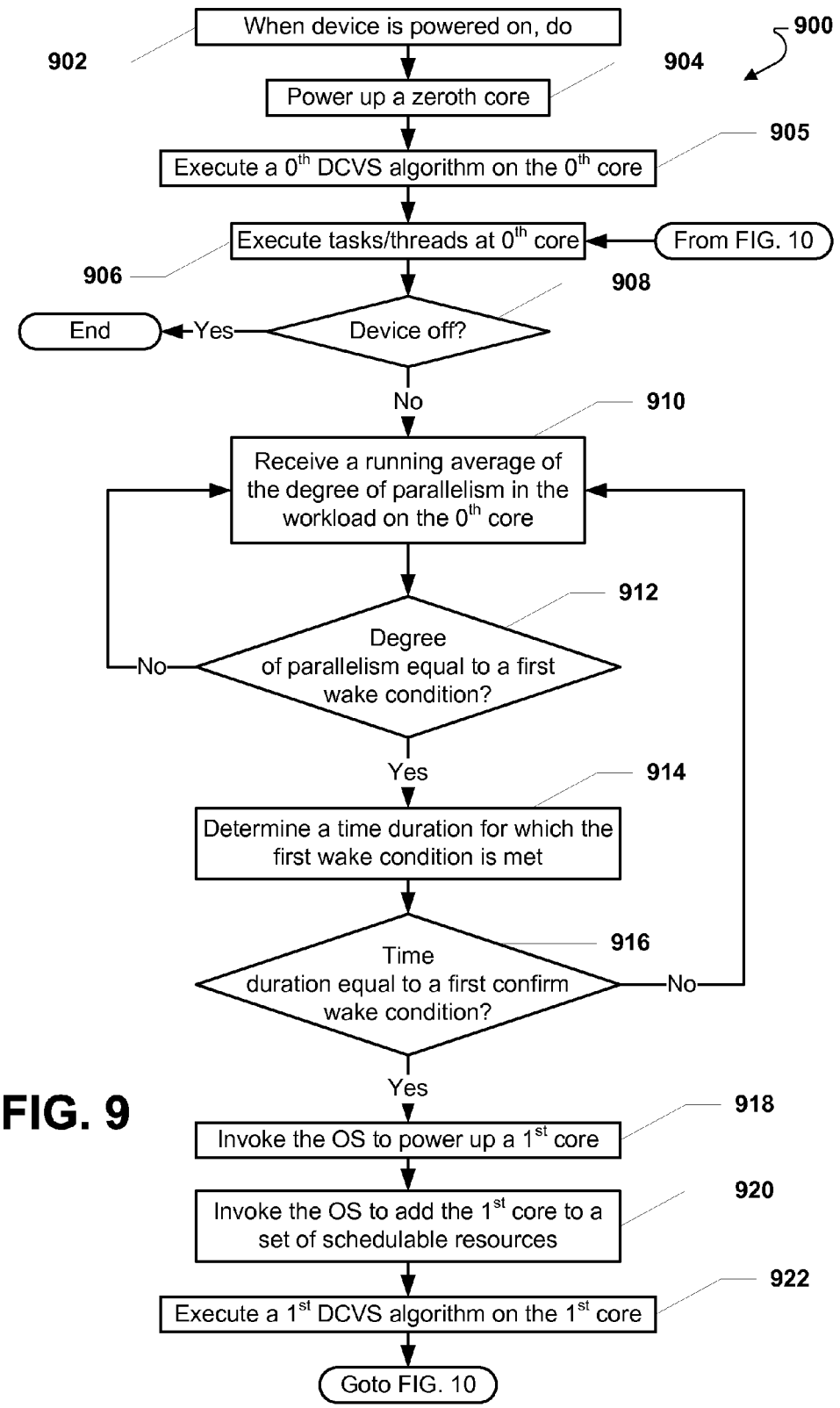
FIG. 9 is a flowchart illustrating a first portion of a fifth aspect of a method of dynamically controlling power within a multicore CPU.

FIG. 8 depicts a fourth aspect of a method of controlling power within a multi-core processor is shown. The method is generally designated 800 and the method 800 may commence at block 802 with a do loop in which during operation of a device having a multi-core processor, the succeeding steps may be performed. At block 804, a parallelism monitor may receive a callback from the operating system (OS) whenever an entry is added or removed from the OS scheduler run queue. Further, at block 806, the parallelism monitor may determine a running average of the degree of parallelism in the workload of the CPUs, or cores.

Moving to block 808, at least partially based on the degree of workload parallelism, the parallelism monitor may power core(s) up or down. In other words, the parallelism monitor may turn the cores on or off based on the workload. At decision 810, the parallelism monitor may determine whether the device is powered off. If the device is powered off, the method may end. Otherwise, if the device remains powered on, the method 800 may return to block 804 and the method 800 may continue as described.

Referring now to FIG. 9 through FIG. 12, a fifth aspect of a method of controlling power within a multi-core processor is shown and is generally designated 900. The method 900 commences at block 902 with a do loop in which when a device having a multi-core processor is powered on, the following steps may be performed. At block 904, a zeroth core may be powered up, i.e., energized. At block 905, a zeroth DCVS algorithm may be executed locally on the zeroth core. Further, at block 906, one or more tasks, or threads, may be executed at the zeroth core.

Moving to decision 908, a multicore processor (MP) controller may determine whether the device is powered off. If so, the method 900 may end. Otherwise, if the device remains powered on, the method 900 may move to block 910 and the MP controller may receive a running average of the degree of parallelism in the workload on the zeroth core from a parallelism monitor. In a particular aspect, at any instant in time, the total number of tasks, threads, or a combination thereof, waiting on the ready-to-run queues of an operating system (OS) plus the number of tasks actually running may be an approximation for the degree of parallelism in the workload on the core.

At decision 912, the MP controller may determine whether the degree of parallelism is equal to a first wake condition. In a particular aspect, the first wake condition may be a threshold value associated with the degree of parallelism in the workload on the core. For example, the threshold value may be a predetermined number of ready-to-run threads in the OS scheduler queues and if the parallelism is greater than or equal to this threshold value, the first wake condition may be met.

Returning to decision 912, if the degree of parallelism is not equal to a first wake condition, the method 900 may return to block 910 and the method 900 may continue as described herein. Otherwise, if the degree of parallelism is equal to a first wake condition, the method 900 may move to block 914 and the MP controller may determine a time duration for which the first wake condition is met. At decision 916, the MP controller may determine whether the time duration is equal to a first confirm wake condition. In a particular aspect, the first confirm wake condition may be a threshold time value and if the time duration for the first wake condition is greater than or equal to the threshold value, the first confirm wake condition may be met.

Returning to decision 916, if the time duration for which the first wake condition is met is not equal to a first confirm wake condition, the method 900 may return to block 910 and the method 900 may continue as described herein. Conversely, if the first confirm wake condition is met, the method 900 may move to block 918 and the MP controller may invoke the OS to power up a first core so that two cores, i.e., the zeroth core and the first core, are running and executing threads and tasks. At block 920, the MP controller may invoke the OS to add the first core to a set of schedulable resources available to the OS. Further, at block 922, a first DCVS algorithm may be executed locally on the first core. Thereafter, the method 900 may proceed to block 1002 of FIG. 10.

Figure 10:
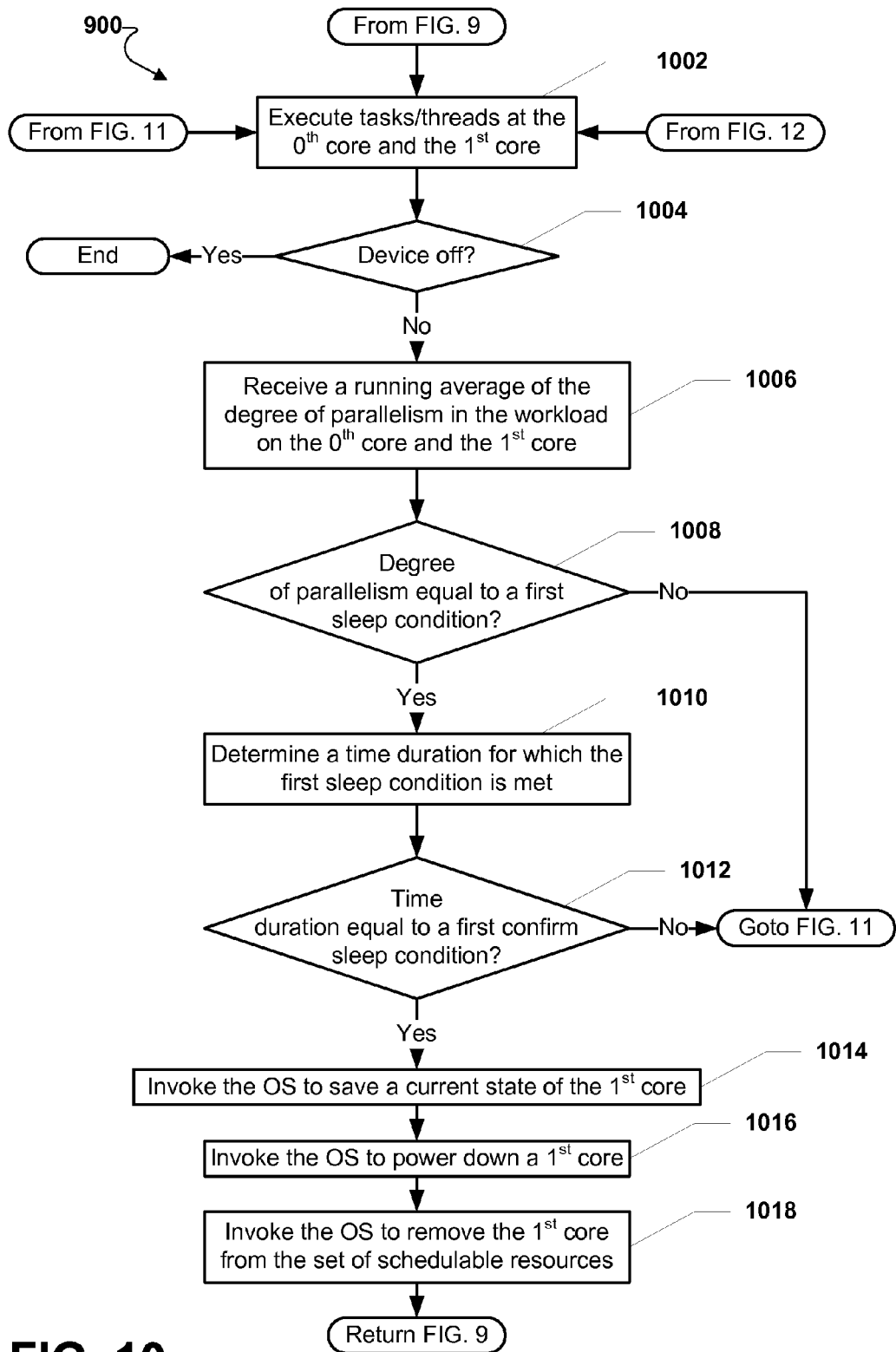
FIG. 10 is a flowchart illustrating a second portion of a fifth aspect of a method of dynamically controlling power within a multicore CPU.

Moving now to block 1002 of FIG. 10, one or more tasks, threads, or a combination thereof may be executed at the zeroth core and the first core. At decision 1004, a MP controller may determine whether the device is powered off. If so, the method 900 may end. Otherwise, if the device remains powered on, the method 900 may move to block 1006 and the MP controller may receive a running average of the degree of parallelism in the workload on the zeroth core and the first core from the parallelism monitor. In a particular aspect, at any instant in time, the total number of tasks, threads, or a combination thereof, waiting on the ready-to-run queues of an operating system (OS) plus the number of tasks actually running may be an approximation for the degree of parallelism in the workload on the cores.

At decision 1008, the MP controller may determine whether the degree of parallelism is equal to a first sleep condition. In a particular aspect, the first sleep condition may be a threshold value associated with the degree of parallelism in the workload on the core. For example, the threshold value may be a minimum number of ready-to-run threads in the OS scheduler queues and if the parallelism is less than or equal to this threshold value, the first sleep condition may be met.

Figure 11:
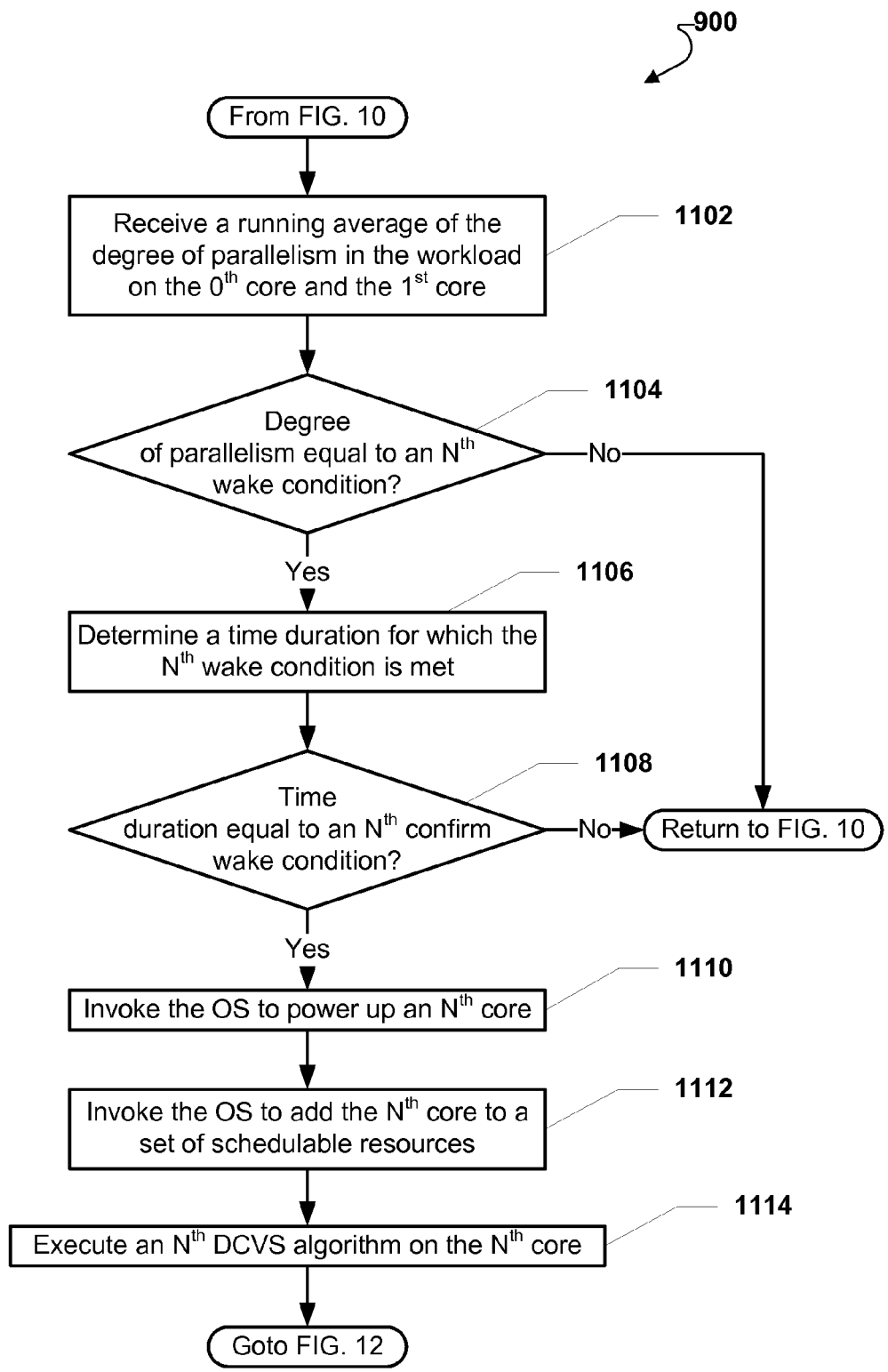
FIG. 11 is a flowchart illustrating a third portion of a fifth aspect of a method of dynamically controlling power within a multicore CPU.

Returning to decision 1008, if the degree of parallelism is not equal to the first sleep condition, the method 900 may proceed to block 1102 of FIG. 11 and the method 900 may continue as described herein. Otherwise, if the degree of parallelism is equal to the first sleep condition, the method 900 may move to block 1010 and the MP controller may determine a time duration for which the first sleep condition is met. At decision 1012, the MP controller may determine whether the time duration is equal to a first confirm sleep condition. In a particular aspect, the first confirm sleep condition may be a threshold time value and if the time duration for the first sleep condition is greater than or equal to the threshold value, the first confirm sleep condition may be met.

Returning to decision 1012, if the time duration for which the first sleep condition is met is not equal to a first confirm sleep condition, the method 900 may proceed to block 1102 of FIG. 11 and the method 900 may continue as described herein. Conversely, if the first confirm sleep condition is met, the method 900 may move to block 1014 and the MP controller may invoke the OS to save a current state of the first core. At block 1016, the MP controller may invoke the OS to power down the first core so that one core, i.e., the zeroth core, is running and executing threads and tasks. Further, at block 1018, the MP controller may invoke the OS to remove the first core from the set of schedulable resources available to the OS. Thereafter, the method 900 may return to block 906 of FIG. 9 and the method 900 may continue as described herein.

Referring now to FIG. 11, at block 1102, the MP controller may receive a running average of the degree of parallelism in the workload on the zeroth core and the first core from the parallelism monitor. In a particular aspect, at any instant in time, the total number of tasks, threads, or a combination thereof, waiting on the ready-to-run queues of an operating system (OS) plus the number of tasks actually running may be an approximation for the degree of parallelism in the workload on the cores. At decision 1104, the MP controller may determine whether the degree of parallelism is equal to an Nth wake condition. In a particular aspect, the Nth wake condition may be a threshold value associated with the degree of parallelism in the workload on the cores. For example, the threshold value may be a maximum number of ready-to-run threads in the OS scheduler queues and if the parallelism is greater than or equal to this threshold value, the Nth wake condition may be met.

Returning to decision 1104, if the degree of parallelism is not equal to the Nth wake condition, the method 900 may return to block 1002 of FIG. 10 and the method 900 may continue as described herein. Otherwise, if the degree of parallelism is equal to the Nth wake condition, the method 900 may move to block 1106 and the MP controller may determine a time duration for which the Nth wake condition is met. At decision 1108, the MP controller may determine whether the time duration is equal to an Nth confirm wake condition. In a particular aspect, the Nth confirm wake condition may be a threshold time value and if the time duration for which the Nth wake condition is greater than or equal to the threshold value, the Nth confirm wake condition may be met.

Returning to decision 1108, if the time duration for which the Nth wake condition is met is not equal to the Nth confirm wake condition, the method 900 may return to block 1002 of FIG. 10 and the method 900 may continue as described herein. Conversely, if the Nth confirm wake condition is met, the method 900 may move to block 1110 and the MP controller may invoke the OS to power up an Nth core so that N cores, i.e., the zeroth core, the first core, and the Nth core, are running and executing threads and tasks. At block 1112, the MP controller may invoke the OS to add the Nth core to a set of schedulable resources available to the OS. Further, at block 1114, an Nth DCVS algorithm may be executed locally on the Nth core. Thereafter, the method 900 may proceed to block 1202 of FIG. 12.

Figure 12:
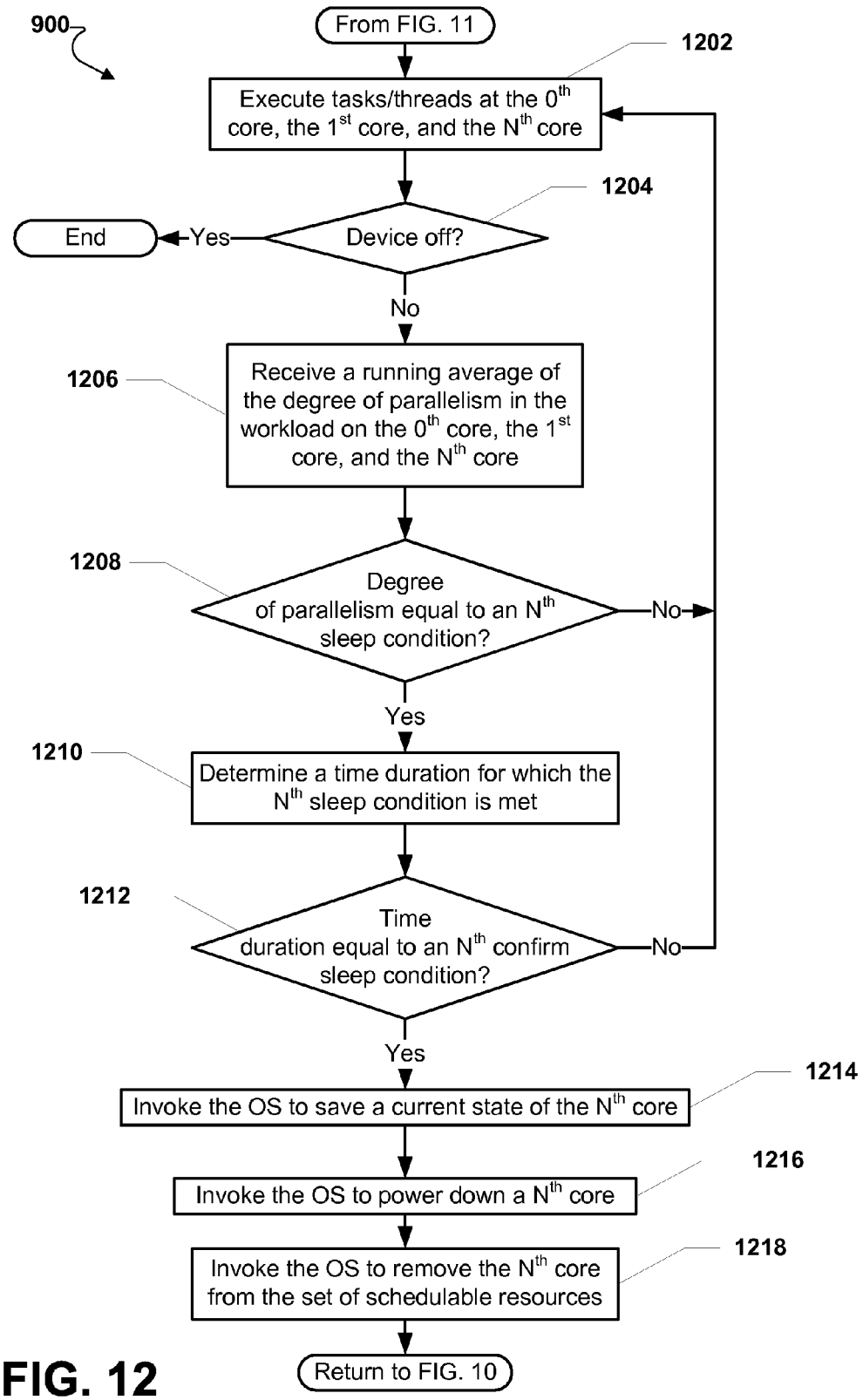
FIG. 12 is a flowchart illustrating a fourth portion of a fifth aspect of a method of dynamically controlling power within a multicore CPU.

At block 1202 of FIG. 12, one or more tasks, threads, or a combination thereof may be executed at the zeroth core, the first core, and the Nth core. At decision 1204, a MP controller may determine whether the device is powered off. If so, the method 900 may end. Otherwise, if the device remains powered on, the method 900 may move to block 1206 and the MP controller may receive a running average of the degree of parallelism in the workload on the zeroth core, the first core, and the Nth from the parallelism monitor. In a particular aspect, at any instant in time, the total number of tasks, threads, or a combination thereof, waiting on the ready-to-run queues of an operating system (OS) plus the number of tasks actually running may be an approximation for the degree of parallelism in the workload on the cores.

At decision 1208, the MP controller may determine whether the degree of parallelism is equal to an Nth sleep condition. In a particular aspect, the Nth sleep condition may be a threshold value associated with the degree of parallelism in the workload on the core. For example, the threshold value may be a minimum number of ready-to-run threads in the OS scheduler queues and if the parallelism is less than or equal to this threshold value, the Nth sleep condition may be met.

Returning to decision 1208, if the degree of parallelism is not equal to the Nth sleep condition, the method 900 may proceed to block 1202 and the method 900 may continue as described herein. Otherwise, if the degree of parallelism is equal to the Nth sleep condition, the method 900 may move to block 1210 and the MP controller may determine a time duration for which the Nth sleep condition is met. At decision 1212, the MP controller may determine whether the time duration is equal to an Nth confirm sleep condition. In a particular aspect, the Nth confirm sleep condition may be a threshold time value and if the time duration for which the Nth sleep condition is greater than or equal to the threshold value, the Nth confirm sleep condition may be met.

Returning to decision 1212, if the time duration for which the Nth sleep condition is met is not equal to the Nth confirm sleep condition, the method 900 may return to block 1202 and the method 900 may continue as described herein. Conversely, if the Nth confirm sleep condition is met, the method 900 may move to block 1214 and the MP controller may invoke the OS to save a current state of the first core. At block 1216, the MP controller may invoke the OS to power down the Nth core so that N minus one cores, e.g., the zeroth core, and the first core (if N is 2 and a second core is powered down), is running and executing threads and tasks. Further, at block 1218, the MP controller may invoke the OS to remove the Nth core from the set of schedulable resources available to the OS. Thereafter, the method 900 may return to block 1002 of FIG. 10 and the method 900 may continue as described herein.

Figure 13:
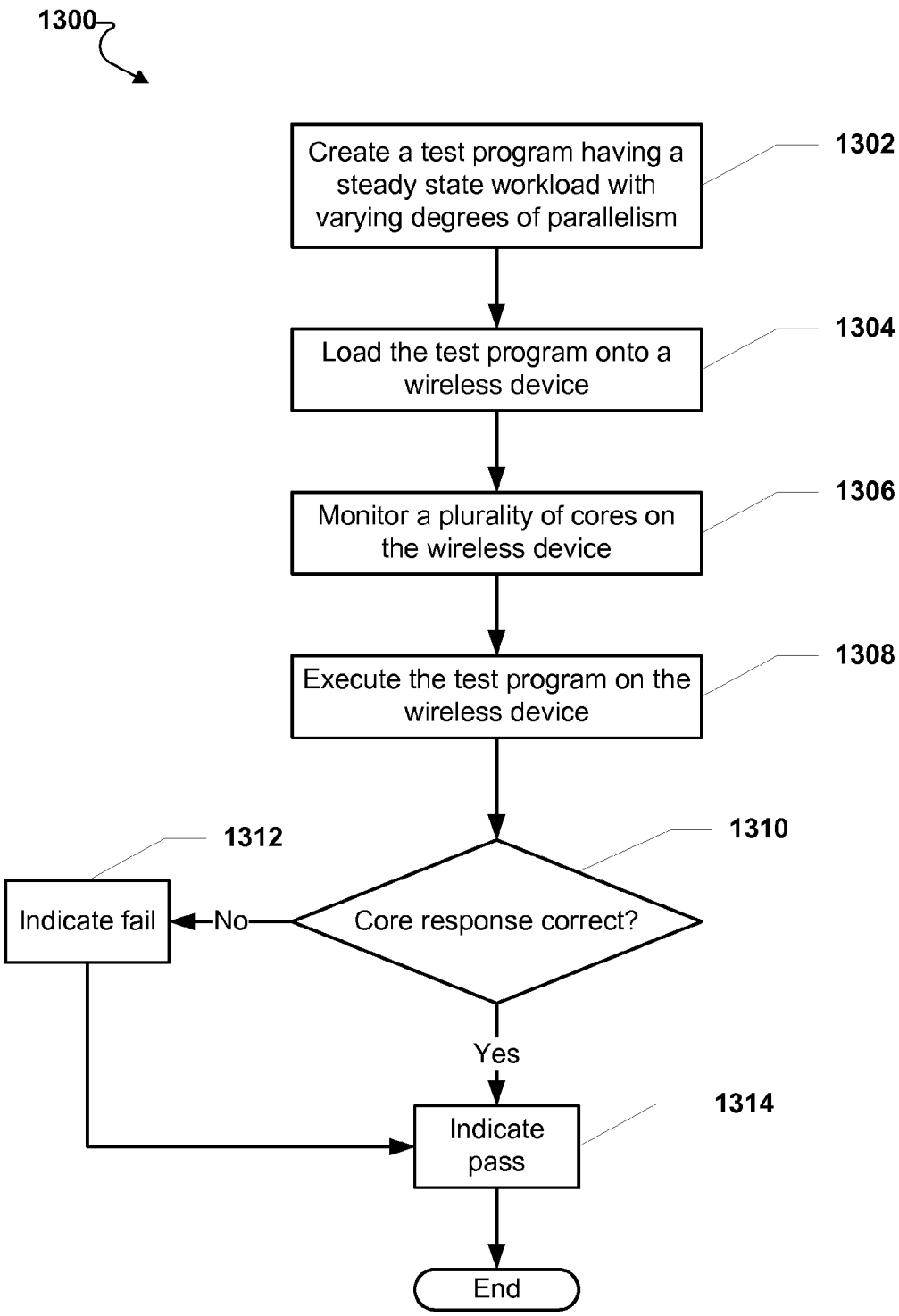
FIG. 13 is a flowchart illustrating a method of testing a multicore CPU.

Referring now to FIG. 13, a method of testing a multicore processor is shown and is generally designated 1300. As shown, the method 1300 may begin at block 1302 where a test program may be created. The test program may include a steady state workload with varying degrees of parallelism which would cause a plurality of cores to power up and down depending on the degree of parallelism, as described herein.

Moving to block 1304, the test program may be loaded onto a wireless device which includes a multicore processor. At block 1306, a plurality of cores may be monitored on the wireless device. For example, the core up/down state for each core may be monitored. The up/down state may be monitored by monitoring the power on each core, by monitoring the total power consumed, the speed at which workloads are completed, or a combination thereof.

At block 1308, the test program may be executed at the wireless device. Moreover, at decision 1310, it may be determined whether the cores within the wireless device respond correctly to the execution of the test program. In other words, it may be determined whether the cores are powering up and/or down correctly in response to the execution of the test program. At decision 1310, if the cores do not respond correctly to the execution of the test program, the method 1300 may move to block 1312 and a fail result may be indicated. The method 1300 may then end.

At decision 1310, if the cores do respond correctly to the execution of the test program, the method may proceed to block 1314 and a pass result may be indicated. Thereafter, the method 1300 may end.

Figure 14:
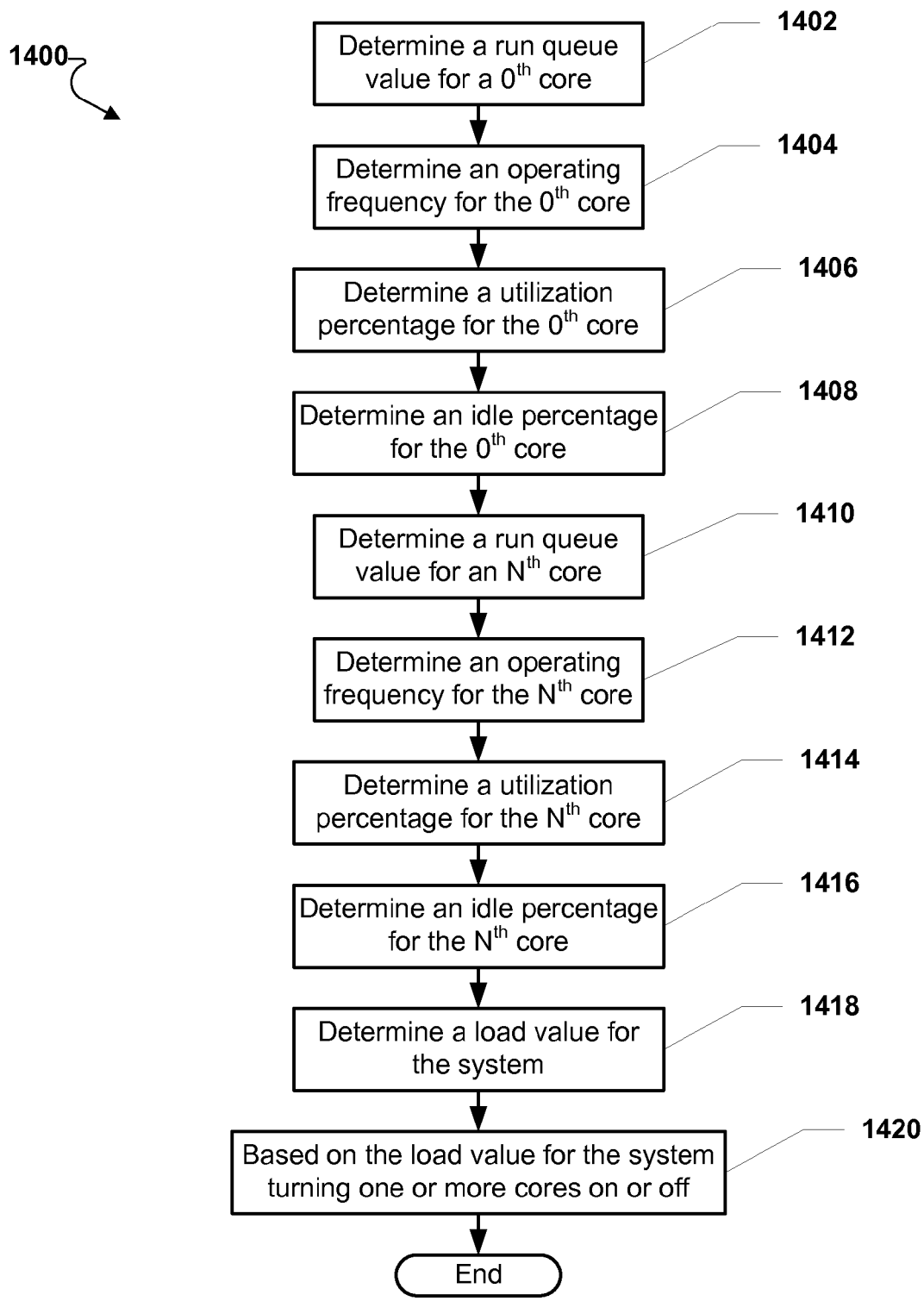
FIG. 14 is a flowchart illustrating a sixth aspect of a method of dynamically controlling power within a multicore CPU.

FIG. 14 illustrates a sixth aspect of a method of dynamically controlling power within a multicore CPU. The method is generally designated 1400. Beginning at block 1402, a controller may determine a run queue value for a zeroth core. The run queue value may indicate the workload for the zeroth core. At block 1404, the controller may determine an operating frequency for the zeroth core. Moreover, at block 1406, the controller may determine a utilization percentage for the zeroth core. In a particular aspect, the utilization percentage for the zeroth core may be the current operating frequency divided by the maximum operating frequency for the zeroth core. At block 1408, the controller may determine an idle percentage for the zeroth core.

Moving to block 1410, the controller may determine a run queue value for an Nth core. At block 1412, the controller may determine an operating frequency for the Nth core. Further, at block 1414, the controller may determine a utilization percentage for the Nth core. At block 1416, the controller may determine an idle percentage for the Nth core.

Moving to block 1418, the controller may determine a load value for the system. The load value may be determined based on the run queue value for the zeroth core, the run queue value for the Nth core, the operating frequency of the zeroth core, the operating frequency of the Nth core, the utilization percentage of the zeroth core, the utilization percentage of the Nth core, the idle percentage for the zeroth core, the idle percentage for the Nth core, or any combination thereof.

In a particular aspect, the load value may be determined from the following formula:

$LV = RQ_0 * ((100\% - IP_0) * (UP_0)) + RQ_N * ((100\% - IP_N) * (UP_N))$ where,
LV=a load value,
$RQ_0$=a run queue value for the zeroth core,
$IP_0$=a idle percentage for the zeroth core,
$UP_0$=a utilization percentage for the zeroth core,
$RQ_N$=a run queue value for the Nth core,
$IP_N$=a idle percentage for the Nth core, and
$UP_N$=a utilization percentage for the Nth core.

At block 1420, one or more cores may be turned on or off based on the load value. It may be determined whether the load value meets a predetermined condition in order to determine whether to turn the one or more cores on or off. For example, the load value may be compared to a threshold and if the load value exceeds the threshold one or more cores may be turned on or off. For example, if there were two cores operating and the load value indicated that the two cores operating at or near capacity, a third core may be powered on and the workload may be spread between the three cores. Further, as the load value decreases below another threshold indicating that having a third core operational is wasting power, the third core may be powered off and the workload may be spread across the two remaining cores. In another aspect, the load value may indicate an actual number of cores that should be running in order to provide the most efficient operation of the system.

In a particular aspect, the controller may maintain historic data regarding the operation of the system and using the historic data, the controller may implement a filter, e.g., an IIR filter, the controller may implement a moving average function, or the controller may implement a combination thereof. An exemplary moving average function is shown below:

$$N = f(\text{run } Q0, \text{run } Q1, N1, N2, N3)$$
$$= 2 \text{ if } ((\text{run } Q0 + \text{run } Q1) + N1 + N2 + N3)/4 > 1, \text{ and}$$
$$= 1 \text{ if } ((\text{run } Q0 + \text{run } Q1) + N1 + N2 + N3)/4 <= 1,$$

where,
runQ0=a run queue value for a zeroth core;
runQ1=a run queue value for a first core; and
N1, N2, N3=the values of N for the last three historical periods.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof.

With the configuration described herein, the system and method disclosed may reduce power consumption within a multicore CPU by powering additional CPU cores when there is likelihood of actual speedup due to workload parallelism. While the degree of parallelism may not be known a-priori, the degree of parallelism may be inferred by observing an operating system scheduler run queue length. Based on the inferred degree of parallelism, additional cores may be power up or down as needed.

Unlike traditional systems, which power all CPU cores symmetrically, i.e., all on or all off, the present system and method may asymmetrically power CPU cores on and off. In other words, one core may be powered on while another is powered off. Further, as the workload increases and has sufficient parallelism, the second core may be powered on.

Further, the system and methods disclosed herein may dynamically adapt the number of powered cores to the actual dynamic parallelism offered in the workload. This may substantially power savings. Further, the system and method does not require developers to communicate the parallelism in their workloads in any special way. Applications may not need to be modified in any way and applications may be deployed in a typical manner. Moreover, the present system and methods are compatible with existing applications and devices.

In a particular aspect, the input to a MP controller is the number of ready-to-run threads in the scheduler queue. It may be appreciated that other inputs that indicate parallelism in the workload may be used. However, a core(s) idle/busy indicator, which does not indicate parallelism, may not be not a sufficient input to the MP controller. For example, a CPU core may be one hundred percent (100%) busy, but running a single-threaded workload. In that case, powering up the second core does not help the performance of the single-thread at all. In fact, it may hurt the performance by introducing overhead necessary to power up the second core. Worse, powering a second core for a single-threaded workload may introduce wasteful leakage power consumption from the second core.

Accordingly, in a particular aspect, it may be undesirable to power up the second core without assurance that there is sufficient parallel work for it to do. In an instantaneous sense, parallel work is only possible when there are two or more threads which are ready to run in the OS scheduler queues.

Under normal operation, in a dual-core example, the system may start out with a DCVS algorithm operating on zeroth CPU core, while a first CPU core remains dormant. In this mode, the system may respond to instantaneous transient loads by ramping up the frequency of the zeroth CPU core. The system ma remain in the single-core mode for as long as there are insufficient ready-to-run threads.

However, once the ready-to-run threshold $N_w$ has been exceeded for a certain amount of time, the zeroth CPU core may be implicitly saturated and there is also clearly a parallel workload available for the first CPU core. A multicore processor (MP) controller may invoke the OS to activate the first CPU core and add the first CPU core to the OS's set of schedulable resources. The MP controller may also starts out the first CPU core at the optimal voltage-frequency point, i.e., the highest frequency at the lowest voltage, and activates the DCVS local to the first CPU core. The MP controller may optionally also reset the frequency of the zeroth CPU core to the optimal voltage-frequency point. Otherwise, the MP controller may leave the frequency of the zeroth CPU core at the current setting.

Both cores may now operate with individually executing DCVS algorithms. With sustained parallel workloads, it may be likely that both cores will eventually attain maximum frequency. However, there may be very brief lulls in load which may allow the cores to partially retreat from the maximum frequency. However, such lulls are not possible without also reducing the number of threads that are ready to run to 0.

Once enough such lulls have occurred, causing the average number of ready-to-run threads to drop below the $N_s$ threshold for a long enough duration, the MP controller may invokes the OS to save any appropriate state from the first CPU core and remove it from its schedulable set. Subsequently, the first CPU core may be safely power collapsed. With the first CPU core power collapsed, the system may return to a single-core operating mode.

In one or more exemplary aspects, the functions described may be implemented in hardware, software, firmware, or any combination thereof. If implemented in software, the functions may be stored as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made therein without departing from the spirit and scope of the present invention, as defined by the following claims.

What is claimed is:

1. A method of dynamically controlling power within a multicore central processing unit (CPU), the method comprising:
   determining a number of operating system scheduler ready-to-run queues that are available for scheduling on the multicore CPU;
   calculating a degree of parallelism in a workload of a zeroth core of the multicore CPU, wherein the degree of parallelism comprises a number of ready-to-run threads in the available operating system scheduler ready-to-run queues;
   determining that the number of ready-to-run threads exceeds a first threshold value for a first time duration that exceeds a second threshold value, wherein the first threshold value is set for triggering a core wake and the second threshold value is set for confirming the core wake;
   calculating a system load value for the multicore CPU based on a run queue value of the zeroth core and an operating frequency of the zeroth core; and
   when the number of ready-to-run threads exceeds the first threshold value for the first time duration that exceeds the second threshold value and the system load value meets a predetermined condition, powering up a first core of the multicore CPU to execute at least one of the available operating system scheduler ready-to-run queues, wherein the system load value indicates a number of powered cores for operation of the multicore CPU.

2. The method of claim 1, wherein the degree of parallelism comprises a total number of tasks, threads, or a combination thereof waiting on one or more ready-to-run queues of an operating system scheduler, a number of tasks, threads, or a combination thereof actually running on the zeroth core, or a combination thereof.

3. The method of claim 1, further comprising:
invoking an operating system to power up the first core when the second threshold value has been exceeded.

4. The method of claim 3, further comprising:
invoking the operating system to add the first core to a set of schedulable resources.

5. The method of claim 4, further comprising:
receiving a degree of parallelism in a workload on the zeroth core and the first core; and
determining whether the degree of parallelism in the workload on the zeroth core and the first core is equal to a first sleep condition.

6. The method of claim 5, further comprising:
determining a second time duration for which the first sleep condition is met when the degree of parallelism in the workload on the zeroth core and the first core is equal to the first sleep condition; and
determining whether the second time duration for which the first sleep condition is met is equal to a first confirm sleep condition.

7. The method of claim 6, further comprising:
invoking the operating system to save a current state of the first core, when the second time duration for which the first sleep condition is met is equal to the first sleep condition.

8. The method of claim 7, further comprising:
invoking the operating system to power down the first core.

9. The method of claim 8, further comprising:
invoking the operating system to remove the first core from the set of schedulable resources.

10. A wireless device, comprising:
means for determining a number of operating system scheduler ready-to-run queues that are available for scheduling on a multicore central processing unit (CPU);
means for calculating a degree of parallelism in a workload of a zeroth core of the multicore CPU, wherein the degree of parallelism comprises a number of ready-to-run threads in the available operating system scheduler ready-to-run queues;
means for determining that the number of ready-to-run threads exceeds a first threshold value for a first time duration that exceeds a second threshold value, wherein the first threshold value is set for triggering a core wake and the second threshold value is set for confirming the core wake;
means for calculating a system load value for the multicore CPU based on a run queue value of the zeroth core and an operating frequency of the zeroth core; and
means for, when the number of ready-to-run threads exceeds the first threshold value for the first time duration that exceeds the second threshold value and the system load value meets a predetermined condition, powering up a first core of the multicore CPU to execute at least one of the available operating system scheduler ready-to-run queues, wherein the system load value indicates a number of powered cores for operation of the multicore CPU.

11. The wireless device of claim 10, wherein the degree of parallelism comprises a total number of tasks, threads, or a combination thereof waiting on one or more ready-to-run queues of an operating system scheduler, a number of tasks, threads, or a combination thereof actually running on the zeroth core, or a combination thereof.

12. The wireless device of claim 10, further comprising:
means for invoking an operating system to power up the first core when the second threshold value has been exceeded.

13. The wireless device of claim 12, further comprising:
means for invoking the operating system to add the first core to a set of schedulable resources.

14. The wireless device of claim 13, further comprising:
means for receiving a degree of parallelism in a workload on the zeroth core and the first core; and
means for determining whether the degree of parallelism in the workload on the zeroth core and the first core is equal to a first sleep condition.

15. The wireless device of claim 14, further comprising:
means for determining a second time duration for which the first sleep condition is met when the degree of parallelism in the workload on the zeroth core and the first core is equal to the first sleep condition; and
means for determining whether the second time duration for which the first sleep condition is met is equal to a first confirm sleep condition.

16. The wireless device of claim 15, further comprising:
means for invoking the operating system to save a current state of the first core, when the second time duration for which the first sleep condition is met is equal to the first sleep condition.

17. The wireless device of claim 16, further comprising:
means for invoking the operating system to power down the first core.

18. The wireless device of claim 17, further comprising:
means for invoking the operating system to remove the first core from the set of schedulable resources.

19. A wireless device, comprising:
a processor configured with processor-executable instructions to perform operations comprising:
determining a number of operating system scheduler ready-to-run queues, the ready-to-run queues comprising at least one of a task or a thread available for scheduling on a multicore central processing unit (CPU);
calculating a degree of parallelism in a workload of a zeroth core of the multicore CPU, wherein the degree of parallelism comprises a number of ready-to-run threads in the available operating system scheduler ready-to-run queues;
determining that the number of ready-to-run threads exceeds a first threshold value for a first time duration that exceeds a second threshold value, wherein the first threshold value is set for triggering a core wake and the second threshold value is set for confirming the core wake;
calculating a system load value for the multicore CPU based on a run queue value of the zeroth core and an operating frequency of the zeroth core; and
when the number of ready-to-run threads exceeds the first threshold value for the first time duration that exceeds the second threshold value and the system load value meets a predetermined condition, powering up a first core of the multicore CPU to execute at least one of the available operating system scheduler ready-to-run queues, wherein the system load value indicates a number of powered cores for operation of the multicore CPU.

20. The wireless device of claim 19, wherein the processor is configured with processor-executable instructions to perform operations such that the degree of parallelism comprises a total number of tasks, threads, or a combination thereof waiting on one or more ready-to-run queues of an operating system scheduler, a number of tasks, threads, or a combination thereof actually running on the zeroth core, or a combination thereof.

21. The wireless device of claim 19, wherein the processor is configured with processor-executable instructions to perform operations further comprising:
invoking an operating system to power up the first core when the second threshold value has been exceeded.

22. The wireless device of claim 21, wherein the processor is configured with processor-executable instructions to perform operations further comprising:
invoking the operating system to add the first core to a set of schedulable resources.

23. The wireless device of claim 22, wherein the processor is configured with processor-executable instructions to perform operations further comprising:
receiving a degree of parallelism in a workload on the zeroth core and the first core; and
determining whether the degree of parallelism in the workload on the zeroth core and the first core is equal to a first sleep condition.

24. The wireless device of claim 23, wherein the processor is configured with processor-executable instructions to perform operations further comprising:
determining a second time duration for which the first sleep condition is met when the degree of parallelism in the workload on the zeroth core and the first core is equal to the first sleep condition; and
determining whether the second time duration for which the first sleep condition is met is equal to a first confirm sleep condition.

25. The wireless device of claim 24, wherein the processor is configured with processor-executable instructions to perform operations further comprising:
invoking the operating system to save a current state of the first core, when the second time duration for which the first sleep condition is met is equal to the first sleep condition.

26. The wireless device of claim 25, wherein the processor is configured with processor-executable instructions to perform operations further comprising:
invoking the operating system to power down the first core.

27. The wireless device of claim 26, wherein the processor is configured with processor-executable instructions to perform operations further comprising:
invoking the operating system to remove the first core from the set of schedulable resources.

28. A non-transitory computer-readable storage medium having stored thereon computer-executable instructions configured to cause a processor to perform operations comprising:
determining a number of operating system scheduler ready-to-run queues that are available for scheduling on a multicore central processing unit (CPU);
calculating a degree of parallelism in a workload of a zeroth core of the multicore CPU, wherein the degree of parallelism comprises a number of ready-to-run threads in the available operating system scheduler ready-to-run queues;
determining that the number of ready-to-run threads exceeds a first threshold value for a first time duration that exceeds a second threshold value, wherein the first threshold value is set for triggering a core wake and the second threshold value is set for confirming the core wake;
calculating a system load value for the multicore CPU based on a run queue value of the zeroth core and an operating frequency of the zeroth core; and
when the number of ready-to-run threads exceeds the first threshold value for the first time duration that exceeds the second threshold value and a system load value meets a predetermined condition, powering up a first core of the multicore CPU to execute at least one of the available operating system scheduler ready-to-run queues, wherein the system load value indicates a number of powered cores for operation of the multicore CPU.

29. The non-transitory computer-readable storage medium of claim 28, wherein the stored computer-executable instructions are configured to cause the processor to perform operations such that the degree of parallelism comprises a total number of tasks, threads, or a combination thereof waiting on one or more ready-to-run queues of an operating system scheduler, a number of tasks, threads, or a combination thereof actually running on the zeroth core, or a combination thereof.

30. The non-transitory computer-readable storage medium of claim 28, wherein the stored computer-executable instructions are configured to cause the processor to perform operations further comprising:
invoking an operating system to power up the first core when the second threshold value has been exceeded.

31. The non-transitory computer-readable storage medium of claim 30, wherein the stored computer-executable instructions are configured to cause the processor to perform operations further comprising:
invoking the operating system to add the first core to a set of schedulable resources.

32. The non-transitory computer-readable storage medium of claim 31, wherein the stored computer-executable instructions are configured to cause the processor to perform operations further comprising:
receiving a degree of parallelism in a workload on the zeroth core and the first core; and
determining whether the degree of parallelism in the workload on the zeroth core and the first core is equal to a first sleep condition.

33. The non-transitory computer-readable storage medium of claim 32, wherein stored the computer-executable instructions are configured to cause the processor to perform operations further comprising:
determining a second time duration for which the first sleep condition is met when the degree of parallelism in the workload on the zeroth core and the first core is equal to the first sleep condition; and
determining whether the second time duration for which the first sleep condition is met is equal to a first confirm sleep condition.

34. The non-transitory computer-readable storage medium of claim 33, wherein stored the computer-executable instructions are configured to cause the processor to perform operations further comprising:
invoking the operating system to save a current state of the first core, when the second time duration for which the first sleep condition is met is equal to the first sleep condition.

35. The non-transitory computer-readable storage medium of claim 34, wherein stored the computer-executable instructions are configured to cause the processor to perform operations further comprising:

invoking the operating system to power down the first core.

36. The non-transitory computer-readable storage medium of claim 35, wherein the stored computer-executable instructions are configured to cause the processor to perform operations further comprising:

at least one instruction for invoking the operating system to remove the first core from the set of schedulable resources.

37. The method of claim 1, wherein calculating the system load value further comprises calculating the system load value based on the run queue value of the zeroth core, the operating frequency of the zeroth core, and one or more historic system load values of the multicore CPU.

38. The wireless device of claim 10, wherein the means for calculating the system load value further comprises means for calculating the system load value based on the run queue value of the zeroth core, the operating frequency of the zeroth core, and one or more historic system load values of the multicore CPU.

39. The wireless device of claim 19, wherein the processor configured with processor-executable instructions to calculate the system load value further comprises the processor configured with processor-executable instructions to calculate the system load value based on the run queue value of the zeroth core, the operating frequency of the zeroth core, and one or more historic system load values of the multicore CPU.

40. The non-transitory computer-readable storage medium of claim 28, wherein the stored computer-executable instructions configured to cause the processor to calculate the system load value further comprises stored computer-executable instructions configured to cause the processor to calculate the system load value based on the run queue value of the zeroth core, the operating frequency of the zeroth core, and one or more historic system load values of the multicore CPU.

* * * * *